Oct. 21, 1969     M. L. BATES     3,473,564
MOVING FLUID COUPLING APPARATUS
Filed Jan. 16, 1968
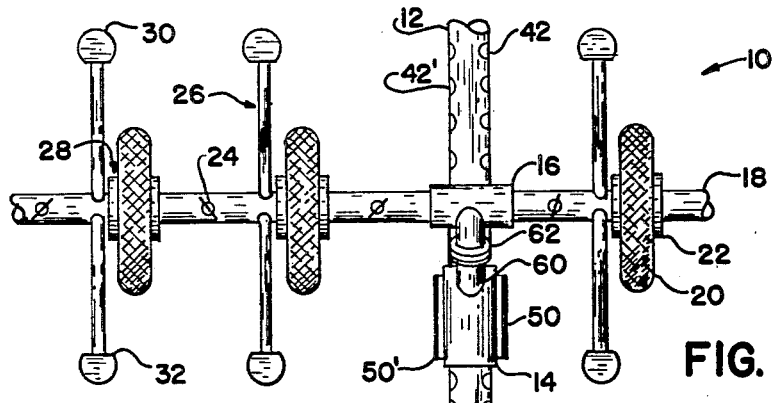
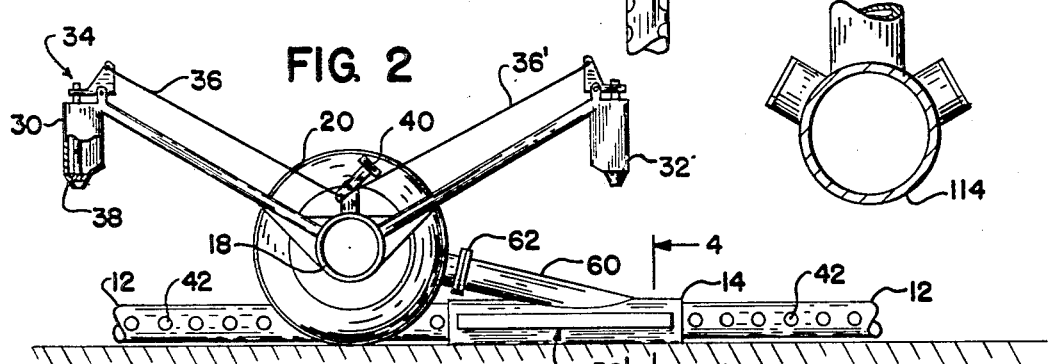
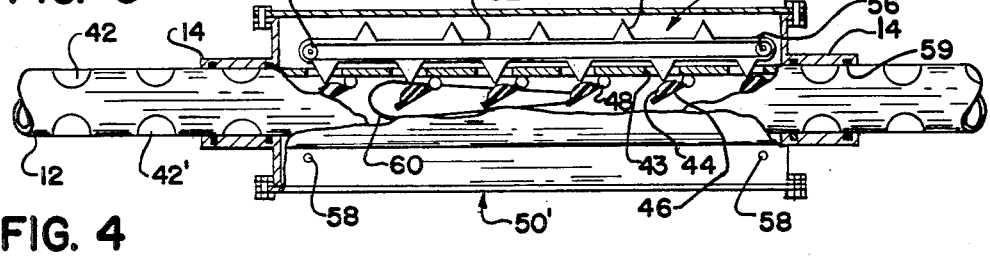
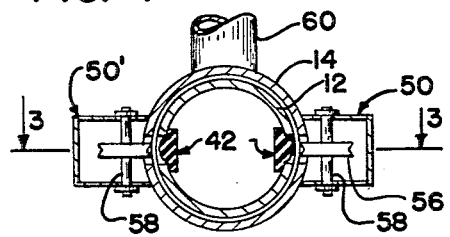
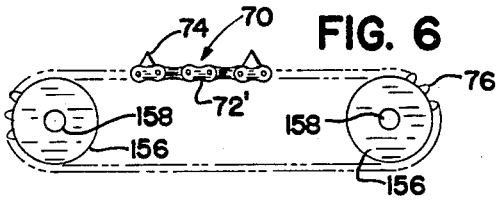
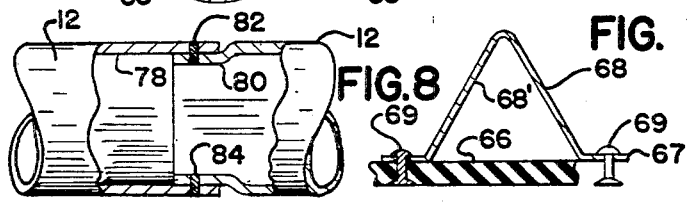
*INVENTOR.*
MARCUS L. BATES

United States Patent Office 3,473,564
Patented Oct. 21, 1969

3,473,564
MOVING FLUID COUPLING APPARATUS
Marcus L. Bates, 6904 N. Russell Ave.,
Odessa, Tex. 79760
Filed Jan. 16, 1968, Ser. No. 698,186
Int. Cl. F16l 27/08; A01g 25/02
U.S. Cl. 137—580                    9 Claims

ABSTRACT OF THE DISCLOSURE

A moving fluid coupling apparatus for a traveling irrigation system for transferring water from a stationary supply pipe into the water distribution means of the system. The fluid coupling is provided with an inlet, an outlet, and valve actuating means. The supply pipe is provided with spaced apart check valve means which cooperate with the valve actuator located within the fluid coupling. The fluid coupling surrounds the supply pipe and as it longitudinally moves along the supply pipe the valves are opened by the valve actuator to thereby permit water to flow from the supply pipe, into the fluid coupling, through the outlet, and into the irrigation system.

BACKGROUND OF THE INVENTION

This invention relates to traveling irrigation systems which travel along the ground while receiving a continuous supply of water from a stationary pipe, and wherein the water is transferred to a water distribution means associated with the system in order to supply the ground over which it travels with a uniform amount of water. Some of the larger irrigation systems of this type are capable of watering a swath of land which measures several hundred feet in width. It should be understood however, that this invention may also be used with the smaller domestic type of irrigation system such as used by the average home owner for watering lawns and the like.

Commercial type irrigation systems as well as the smaller single sprinkler type systems that rely upon a flexible water conduit which is dragged behind the traveling irrigation device are known in the art. It has also previously been suggested that traveling irrigation systems be provided with a zipped conduit wherein a flexible coupling member is fitted into the flexible conduit, wherein the conduit is continuously zipped closed so as to provide a source of fluid to traveling irrigation systems. While both of these systems function satisfactorily under certain conditions of usage, the first has the obvious drawback of the necessity of continuously extending the length of the supply conduit as the device moves along the ground, and the latter has the obvious drawback of high pressure limitations.

SUMMARY

The present invention is directed to a moving fluid coupling apparatus for a traveling irrigation system for transferring water from a stationary supply pipe into the water distribution means of the system. The fluid coupling is provided with an inlet, an outlet, and valve actuating means. The supply pipe is provided with spaced apart check valve means which cooperate with the valve actuator located within the fluid coupling. The fluid coupling surrounds the supply pipe and as it longitudinally moves along the supply pipe the valves are opened by the valve actuator to thereby permit water to flow from the supply pipe, into the fluid coupling, through the outlet, and into the irrigation system.

It is therefore an object of the present invention to provide a traveling irrigation system with a continuous water supply which enables the traveling irrigation device to completely traverse a field while being unattended.

Another object of the present invention is the provision of a fluid coupling means which enables a traveling water consuming device to be supplied with a continuous source of water from a fixed pipe.

A still further object of the present invention is the provision of a water transferring means which permits the flow of water from a fixed conduit into a moving conduit.

The above objects are attained in accordance with the present invention by the provision of a fluid coupling apparatus which is fabricated in accordance with the present invention as essentially defined in the above abstract.

Other objects of the present invention will become apparent to those skilled in the art after having read the following descriptive portion of the specification taken together with the claims and drawings.

BRIEF DESCRIPTION OF THE DRAWINGS

FIGURE 1 is a top plan view of one form of the present invention showing its operative association with respect to a traveling irrigation device;

FIGURE 2 is a side elevational view of the device seen in FIGURE 1;

FIGURE 3 is a fragmentary partly cross-sectional view taken along line 3—3 of FIGURE 4, with some parts left unsectioned for clarity, and other parts being broken away and shown in cross-section;

FIGURE 4 is a fragmentary partly cross-sectional view taken along line 4—4 of FIGURE 2;

FIGURE 5 is a fragmentary cross-sectional view of a modification of the device seen in the foregoing figures;

FIGURE 6 is an enlarged representation of a modification of part of the device seen in FIGURES 3 and 4;

FIGURE 7 is an enlarged fragmentary representation of the modification of the device seen in FIGURE 6;

FIGURE 8 is a fragmentary representation of part of the device which may be used in conjunction with the foregoing figures.

DESCRIPTION OF THE PREFERRED EMBODIMENT

Looking now to the details of the drawings wherein there is seen a traveling irrigation system generally indicated by the arrow at numeral 10. The system includes a stationary supply pipe 12 which is connected to suitable source (not shown) of water under pressure. A traveling fluid coupling 14 is comprised of an elongated housing which circumferentially and sealingly encloses the pipe. A sealed swivel joint 16 connects the fluid coupling to a lateral moving irrigation pipe 18. The lateral irrigation pipe is suitably suspended by a multiplicity of journaled wheels 20 which support the device above the ground. The wheels are suitably journaled to the pipe 18 by members 22. A multiplicity of spaced apart sprinklers 24 distribute water which flows therethrough in the usual manner. Rigidly attached to the lateral pipe 18 are upwardly depending spaced apart cantilever supply pipes 26 which are connected to a transmission 28 associated with each wheel adjacent to the cantilever arms. The cantilever arms support a forward bucket 30 and rear bucket 32. Associated with bucket 30 is a valve system 34 which is actuated by rod 36. The valve actuator cooperates with a valve and seat arrangement 38 in accordance with the position of the over the center weight 40. It should be understood that while a specific type of traveling irrigation mechanism is shown in conjunction with the fluid coupling 14, that other types of traveling irrigation systems are contemplated to be used with the fluid coupling device disclosed and claimed herein.

The supply pipe 12 is provided with two rows of check valves 42 and 42'. The check valves cooperate with a valve seat 43 which is formed in the wall of the pipe. The check valve includes an outer valve portion 44 which extends into the valve seat with the surface thereof being flush with the outside peripheral surface of the pipe 12. The inside portion 46 of the check valve is enlarged so as to be forced into sealing eengagement against the inside peripheral wall surface of the pipe 12. Each check valve is journaled as at 48. The specific check valve means presented herein is for the purposes of illustration only, and it should be understood that other check valve means may be employed. For example, the specific check valve means 42 through 48 would be difficult to install throughout a long length of pipe since the illustrated valve must be assembled internally of the pipe. Accordingly, any type check valve arrangement which may be moved to the open position by the application of a suitable external force is considered to fall within the comprehension of this invention.

The fluid coupling includes a valve actuator housing 50 and 50' which are located in superimposed position with respect to each line of valves 42 and 42' respectively. The valve housing is similar in operation to a tractor track and includes an endless belt 52 which rotatably or movably carries spaced apart valve engaging fingers or lugs 54 thereon. Spaced apart pulleys 56 are rotatably mounted in journaled relationship within the walls or confines of the housing by means of pulley mount pins 58. It should be noted that fingers 54 are spaced apart a distance identical to the spaced apart distance of the valve seats 43. The pulleys are arranged with respect to the outer peripheral wall surface of the pipe whereby the endless belt 52 rides closely adjacent to the outer pipe wall so as to allow the fingers to depend into the valve seat an amount sufficient to upset each of the valves as the fluid coupling travels longitudinally along the supply pipe.

The depending ends of the fluid coupling are provided with suitable seal means in the form of spaced apart pairs of O-rings 59. A downcomer 60 connects the fluid coupling to the lateral irrigation pipe 18. A flexible joint 62 may be interposed between the before mentioned sealed swivel joint 16 and the fluid coupling where such an expedient is deemed desirable.

FIGURES 6 and 7 show two alternate constructions or embodiments of the valve actuator means. As seen illustrated therein, the endless belt may be a conventional cord reinforced rubber or rubber-like V-belt 66 having a piece of stamped out stainless steel metal which is bent into ears 67 having legs 68 and 68' which cooperate to form a common apex with the ears being riveted to the belt as seen at 69. Alternatively, a chain and sprocket arrangement having a chain 70 made up of links 72' with fingers 74 attached to alternate links with the links engaging teeth 76 of the sprockets 156 may be employed in lieu of a flexible belt. The sprockets are maintained in spaced apart relationship within and with respect to the housing by means of sprocket mount pins 158, similar to the manner in which the pulleys 56 are secured in the embodiment of FIGURE 4.

Supply pipe 12 must be of the flush joint type, as illustrated in FIGURE 8. The pipe preferably has a nominal diameter 78 with the opposite terminal end being reduced sufficiently in diameter, as illustrated at numeral 80, so as to be received within an adjacent terminal end of a pipe. Pins 82 maintain the pipe connected together. A seal may be provided at the pipe joint to prevent leakage of water therefrom. The use of the before mentioned multiple O-rings 59 eliminates significant leakage as the fluid coupling passes over each joint.

OPERATION

In operation the supply pipe 12 is connected to a suitable source of water and laid across a field to be irrigated. When making up the supply pipe, the fluid coupling must be telescoped over a free end section of the pipe 12 prior to final assembly. Assuming the fluid coupling to be connected in the illustrated manner of FIGURE 1, and that the sprinkler is traveling across the field in a direction toward the top of the drawing, the traveling sprinkler will slidably pull the fluid coupling along the length of the pipe 12. As the fluid coupling moves or slides along the pipe, fingers 54 will engage valve seats 43 in a manner similar to a sprocket and chain arrangement since the fingers 54 are spaced apart equal to the distance between the spaced apart valve seats. Since an available source of pressurized water is contained within the supply pipe 12, as each valve 42 is upset to the open position, water flows into the valve actuator housing, through the annulus provided between the fluid coupling member 14 and the supply pipe 12, up the downcover 60, through the sealed swivel joint 16, and into the lateral irrigation pipe 18 where it is available to provide the pressurized source of water to the multiplicity of spaced apart sprinklers 24.

It is pointed out that the swivel joint is not a necessary component of the present invention, and that the particular traveling irrigation device 18–40 is the subject matter of still another disclosure. Furthermore, the choice of the materials of construction may be other than as specifically disclosed herein, while still remaining within the spirit of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A moving fluid coupling apparatus for transferring water from a stationary supply pipe into a traveling water distribution means comprising:

means forming a housing which circumferentially encloses a limited length of said supply pipe, with said housing being slidably received about said supply pipe;

means forming a multiplicity of spaced apart check valves longitudinally disposed along said supply pipe for conducting fluid flow therefrom;

said housing including means for opening said check valves which are encompassed therewithin;

means forming a flow passageway which is adapted to conduct fluid flow from said housing to the traveling water distribution means; whereby:

the check valves located within the housing are engaged by the means for opening said check valves as the fluid coupling moves along the supply pipe to thereby enable fluid to flow from the supply pipe, through a check valve, into the housing, through the means forming a flow passageway, and to the traveling water distribution means.

2. The fluid coupling apparatus of claim 1, and further including:

seal means disposed between the supply pipe and the housing for preventing the flow of fluid away from the means forming a flow passageway.

3. The fluid coupling apparatus of claim 1, wherein said means forming the check valve includes a valve seat, a valve element normally seated on said seat in fluid flow preventing relationship therewith;

said valve element adapted to be moved away from said seat to thereby permit the flow of fluid therethrough;

said valve and said valve seat being located in a wall of said supply pipe with the outermost portion of said valve and valve seat extending outwardly from the pipe a maximum distance which is defined by the outer peripheral surface of the pipe.

4. The fluid coupling apparatus of claim 1 wherein said means for opening said check valves includes a multiplicity of fingers; said fingers being spaced apart from one another an amount equivalent to the distance between said spaced apart check valves;

means for rotatably maintaining said multiplicity of fingers in close proximity to said supply pipe where adjacent spaced apart fingers engage adjacent spaced apart check valves to thereby move the check valves to the flow permitting position as they are each engaged by a finger.

5. The fluid coupling apparatus of claim 4 wherein said means for rotatably maintaining said multiplicity of fingers in close proximity to said supply pipe includes spaced apart journaled pulleys, an endless belt located about said journaled pulleys, said fingers depending from said endless belt; whereby:

said fingers depend into said valve seats as said fluid coupling slides along said supply pipe.

6. The fluid coupling apparatus of claim 4 wherein said means for rotatably maintaining said multiplicity of fingers in close proximity to said supply pipe includes spaced apart journaled sprockets, an endless chain located about said journaled sprockets, said fingers depending from said endless chain; whereby:

said fingers depend into said valve seats as said fluid coupling slides along said supply pipe.

7. The fluid coupling apparatus of claim 1, wherein said means forming the check valve includes a valve seat, a valve element normally seated on said seat in fluid flow preventing relationship therewith;

said valve element adapted to be moved away from said seat to thereby permit the flow of fluid therethrough;

said valve and said valve seat being located in a wall of said supply pipe with the outermost portion of said valve and valve seat extending outwardly from the pipe a maximum distance which is defined by the outer peripheral surface of the pipe;

said means for opening said check valves includes a multiplicity of fingers; said fingers being spaced apart from one another an amount equivalent to the distance between said spaced apart check valves;

means for rotatably maintaining said multiplicity of fingers in close proximity to said supply pipe where adjacent spaced apart fingers engage adjacent spaced apart check valves to thereby move the check valves to the flow permiting position as they are each engaged by a finger.

8. The fluid coupling apparatus of claim 7 wherein said means for rotatably maintaining said multiplicity of fingers in close proximity to said supply pipe includes spaced apart journaled pulleys, an endless belt located about said journaled pulleys, said fingers depending from said endless belt; whereby:

said fingers depend into said valve seats as said fluid coupling slides along said supply pipe.

9. The fluid coupling apparatus of claim 7 wherein said means for rotatably maintaining said multiplicity of fingers in close proximity to said supply pipe includes spaced apart journaled sprockets, an endless chain located about said journaled sprockets, said fingers depending from said endless chain; whereby:

said fingers depend into said valve seats as said fluid coupling slides along said supply pipe.

References Cited

UNITED STATES PATENTS

| | | | |
|---|---|---|---|
| 3,326,234 | 6/1967 | Baker et al. | 137—580 |
| 3,349,794 | 10/1967 | Behlen | 137—580 |

HENRY S. JAUDON, Primary Examiner